United States Patent
Dazzi et al.

(10) Patent No.: US 10,831,691 B1
(45) Date of Patent: Nov. 10, 2020

(54) METHOD FOR IMPLEMENTING PROCESSING ELEMENTS IN A CHIP CARD

(71) Applicant: International Business Machines Corporation, Armonk, NY (US)

(72) Inventors: Martino Dazzi, Thalwil (CH); Pier Andrea Francese, Adliswil (CH); Abu Sebastian, Adliswil (CH); Riduan Khaddam-Aljameh, Zurich (CH); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/422,745

(22) Filed: May 24, 2019

(51) Int. Cl.
*G06F 13/40* (2006.01)
*G06N 5/04* (2006.01)
*G06N 3/08* (2006.01)
*G06F 16/901* (2019.01)

(52) U.S. Cl.
CPC ...... *G06F 13/4027* (2013.01); *G06F 16/9024* (2019.01); *G06N 3/08* (2013.01); *G06N 5/04* (2013.01)

(58) Field of Classification Search
CPC ... G06F 13/4027; G06F 16/9024; G06N 3/08; G06N 5/04
USPC ........................................................ 710/306
See application file for complete search history.

(56) References Cited

U.S. PATENT DOCUMENTS

| | | | | |
|---|---|---|---|---|
| 6,126,331 A * | 10/2000 | Komatsu | ........... | G06F 15/17368 717/149 |
| 6,437,804 B1 * | 8/2002 | Ibe | .......... | G06F 30/18 715/736 |
| 6,442,584 B1 * | 8/2002 | Kolli | ..... | G06F 9/5061 718/104 |
| 7,197,624 B2 * | 3/2007 | Pechanek | .......... | G06F 15/17337 712/11 |

(Continued)

OTHER PUBLICATIONS

Manoj Alwani et al., Fused-Layer CNN Accelerators, 49th Annual IEEE/ACM International Symposium on Microarchitecture (MICRO), 2016, 12 pages.

(Continued)

*Primary Examiner* — Paul R. Myers
(74) *Attorney, Agent, or Firm* — Daniel Morris; Otterstedt, Wallace & Kammer, LLP

(57) ABSTRACT

The present disclosure relates to a method for implementing processing elements in a chip card such that the processing elements can communicate data between each other in order to perform a computation task, wherein the data communication requires each processing element to have a respective number of connections to other processing elements. The method comprises: providing a complete graph with an even number of nodes that is higher than the maximum of the numbers of connections by one or two. If the number of processing elements is higher that the number of nodes of the graph, the graph may be duplicated and the duplicated graphs may be combined into a combined graph. A methodology for placing and connecting the processing elements may be determined in accordance with the structure of nodes of a resulting graph, the resulting graph being the complete graph or the combined graph.

14 Claims, 10 Drawing Sheets

(56) References Cited

U.S. PATENT DOCUMENTS

| | | | |
|---|---|---|---|
| 7,328,371 B1* | 2/2008 | Kalyanasundharam | G06F 11/1641 712/22 |
| 7,408,889 B2* | 8/2008 | Chen | H04L 12/4633 370/254 |
| 8,250,503 B2* | 8/2012 | Vorbach | G06F 30/30 716/104 |
| 9,875,440 B1 | 1/2018 | Commons | |
| 10,289,447 B1* | 5/2019 | Thompson | G06K 9/6247 |
| 10,628,622 B1* | 4/2020 | Sivaraman | G06F 30/34 |
| 2003/0067867 A1* | 4/2003 | Weis | H04L 45/02 370/210 |
| 2003/0212941 A1* | 11/2003 | Gillies | H04W 24/06 714/726 |
| 2005/0197993 A1* | 9/2005 | Korotky | H04J 14/0284 706/52 |
| 2008/0155520 A1* | 6/2008 | Meloche | H04L 43/0811 717/157 |
| 2009/0016355 A1* | 1/2009 | Moyes | H04L 45/02 370/395.31 |
| 2010/0042397 A1* | 2/2010 | Masugata | G06F 16/9024 704/2 |
| 2010/0153905 A1* | 6/2010 | Maeda | G06F 30/39 716/54 |
| 2015/0067123 A1* | 3/2015 | Goyal | G06F 16/90344 709/223 |
| 2016/0132765 A1* | 5/2016 | Alpert | G06N 3/049 706/28 |
| 2018/0053085 A1 | 2/2018 | Matsumoto et al. | |
| 2018/0285725 A1 | 10/2018 | Baum et al. | |
| 2019/0279086 A1* | 9/2019 | Nicol | G06N 3/08 |

OTHER PUBLICATIONS

Dally, et al., Deadlock-Free Message Routing in Multiprocessor Interconnection Networks, IEEE Transactions on Computers, vol. C-36, No. 5, May 1987, pp. 547-553.

W.J. Dally, B. Towles, "Principles and Practices of Interconnection Networks" Morgan Kaufmann Publishers, 2004 (Abstract and Table of Contents only, pp. 1-4, downloaded May 24, 2019 from https://dl.acm.org/citation.cfm?id=2821589).

Kaiming He et al., Deep residual learning for image recognition. In Proceedings of the IEEE conference on computer vision and pattern recognition 2016 (pp. 770-778).

* cited by examiner

320

Algorithm 1 5 Parallel Prism Construction

1: % *The initial disjoint union of unit graphs has vertices:*
2: % $\{\tilde{a}_1, \tilde{b}_1, ..., \tilde{e}_1, \tilde{f}_1, ..., \tilde{a}_M, ..., \tilde{f}_M\}$
3: % *It creates a 5PP with vertices* $\{a_1, ..., a_M, b_1, ..., b_M, c_M, d_M, e_M, f_M\}$
4: % *The first unit graph comprises the first 6 vertices of the 5PP*
5:
6: $\{a_1, b_1, c_1, d_1, e_1, f_1\} = \{\tilde{a}_1, \tilde{b}_1, \tilde{c}_1, \tilde{d}_1, \tilde{e}_1, \tilde{f}_1\}$;
7:
8: for $j = 1 : (M-1)$ do
9: $\quad a_{j+1} = c_j \odot \tilde{a}_{j+1}$;
10: $\quad b_{j+1} = d_j \odot \tilde{b}_{j+1}$;
11: $\quad c_{j+1} = e_j \odot \tilde{c}_{j+1}$;
12: $\quad d_{j+1} = f_j \odot \tilde{d}_{j+1}$;
13: $\quad e_{j+1} = \tilde{e}_{j+1}$;
14: $\quad f_{j+1} = \tilde{f}_{j+1}$;
15: end for

Fig. 3E

METHOD FOR IMPLEMENTING PROCESSING ELEMENTS IN A CHIP CARD

BACKGROUND

The present invention relates to the field of computer systems, and more specifically, to a method for implementing and interconnecting processing elements in a chip card.

Hardware acceleration enables the use of computer hardware specially made to perform some functions more efficiently than is possible in software running on a general-purpose CPU. For example, an operation can be computed in application-specific hardware designed to compute the operation faster than on a general-purpose computer processor. However, there is a need to improve the design of such hardware accelerators.

SUMMARY

Various embodiments provide a method for implementing processing elements in a chip card, computer system and computer program product as described by the subject matter of the independent claims. Advantageous embodiments are described in the dependent claims. Embodiments of the present invention can be freely combined with each other if they are not mutually exclusive.

In one aspect, the invention relates to a manufacturing method for implementing processing elements in a chip card such that the processing elements can communicate data between each other in order to perform a computation task, wherein the data communication requires each processing element to have a respective number of connections to other processing elements. The method comprises:
  providing a complete graph with an even number of nodes that is higher than the maximum of the numbers of connections;
  if the number of processing elements is higher that the number of nodes of the graph, duplicating the graph and combining the duplicated graphs into a combined graph such that the number of nodes in the combined graph is higher than or equal to the number of processing elements;
  determining a methodology for placing and connecting the processing elements in accordance with the structure of nodes of a resulting graph, the resulting graph being the complete graph or the combined graph.

In another aspect, the invention relates to a computer system for enabling implementation of processing elements in a chip card such that the processing elements can communicate data between each other in order to perform a computation task, wherein the data communication requires each processing element to have a respective number of connections to other processing elements. The computer system being configured for:
  providing or generating a complete graph with an even number of nodes that is higher than the maximum (Nmax) of the numbers of connections;
  if the number of processing elements is higher that the number of nodes of the graph, duplicating the graph and combining the duplicated graphs into a combined graph such that the number of nodes in the combined graph is higher than or equal to the number of processing elements;
  determining a methodology for placing and connecting the processing elements in accordance with the structure of nodes of a resulting graph, the resulting graph being the complete graph or the combined graph.

In another aspect, the invention relates to a computer program product comprising a computer-readable storage medium having computer-readable program code embodied therewith, the computer-readable program code configured for enabling implementation of processing elements in a chip card such that the processing elements can communicate data between each other in order to perform a computation task, wherein the data communication requires each processing element to have a respective number of connections to other processing elements; the computer-readable program code further configured for:
  providing a complete graph with an even number of nodes that is higher than the maximum of the numbers of connections;
  if the number of processing elements is higher that the number of nodes of the graph, duplicating the graph and combining the duplicated graphs into a combined graph such that the number of nodes in the combined graph is higher than or equal to the number of processing elements;
  determining a methodology for placing and connecting the processing elements in accordance with the structure of nodes of a resulting graph, the resulting graph being the complete graph or the combined graph.

BRIEF DESCRIPTION OF THE DRAWINGS

In the following embodiments of the invention are explained in greater detail, by way of example only, making reference to the drawings in which:

FIG. 3E is an algorithm for performing the combination of complete graphs in accordance with an example of the present subject matter.

DETAILED DESCRIPTION

Figure 1:
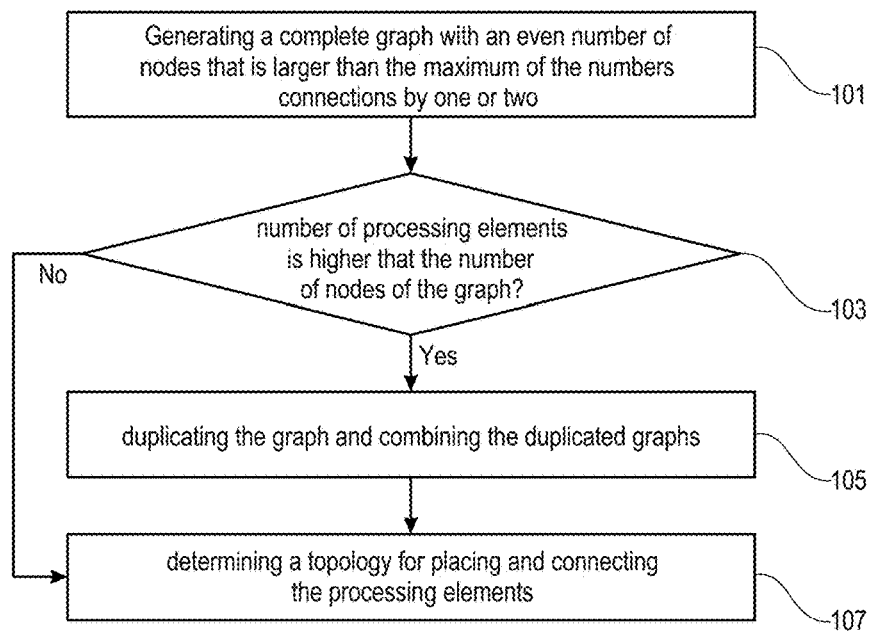
FIG. 1 is a flowchart of a method for implementing processing elements in a chip card in accordance with an example of the present subject matter.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enable to improve communication and interconnection between processing elements for obtaining low-power and efficient hardware accelerators. For example, in the case of in-memory computation, in which neurons are stored on devices and are stationary during execution, the present subject matter may reduce the complexity related to the communication of the intermediate feature maps, which need at all times to be directed toward the adequate in-memory computational units. The present subject matter may thus be suitable for use in in-memory computational core arrays.

The present subject may enable a pipelined execution of the computation task which may reduce the overall latency. For example, the computation task may be performed using a pipelining scheme. The pipelining scheme may define a pipeline which is divided in stages, wherein each stage completes a part of the computation task in parallel and the stages are related one to the next to form a pipeline. The present method may for example enable the execution of pipelined convolutional neural networks (CNNs).

The present subject matter may leverage on the proximity of the processing elements, thus employing connections whose implementation would be, because of their physical size, suitable for the case of in-memory computational units. This may for example enable to implement an interconnection topology that is flexible enough to be used for the majority of the CNN architectures and which can scale with the depth of the networks. Thus, the present subject matter may enable a scalable solution. This may particularly be advantageous as the size of a neural network can vary depending on the type of classification that needs to be performed and on the attainable accuracy, and thus the infrastructure must also be scalable.

The processing elements may be in-memory computational units such as memristor crossbar arrays and/or digital units. The processing elements may be placed as a 2D array of processing elements. A connection is between two processing elements of the processing elements in accordance with the present disclosure. A single connection between two processing elements indicates that the two processing elements are connected, wherein the connection can physically be implemented by one or more links. In other terms, two processing elements have a single connection between them regardless of how they are physically connected and if they are not physically connected at all there is no connection between them. For example, the connection refers to an edge connecting two vertices in a graph representing the processing elements. In case Nmax=5, the complete graph may be a K6 graph. The combined graph may have a prism-shaped graph topology which may be named 5-Parallel Prism which has a given number of vertices. The 5 parallel prism (5PP) may have the following properties. An out-degree $d°$ of a vertex v of a directed graph may be the number of outgoing edges from v. By construction, every vertex belongs to at least one complete graph K6. Given an odd(even) h-coloring of the 5PP {a1, b1, . . . , aN}, vertex aN has at least possible $d°=5(4)$. An even h-coloring may be an h-coloring that colors an even number of vertices {a1, . . . , aN, b1, . . . , bN}. Obversely, an odd h-coloring may be an h-coloring in which the number of h-colored vertices is odd. The maximum number of vertices accessible in parallel in the topology gives it its name. Given an odd(even) h-coloring of the 5P.P., the coloring can always be continued with a complete bipartite graph Km,n with (m+n) ≤5, and with m+n=6 ⇔n is odd(even). The methodology comprises determining a topology for placing and connecting the processing elements in accordance with the structure of nodes of the resulting graph.

In one example, a method for implementing processing elements in a chip or card such that the processing elements can communicate data between each other in order to perform a computation task, wherein the data communication requires each processing element to have a respective number of connections to other processing elements. The method comprises: providing a complete graph with an even number of nodes that is higher than the maximum of the numbers of connections; if the number of processing elements is higher that the number of nodes of the graph, duplicating the graph and combining the duplicated graphs into a combined graph such that the number of nodes in the combined graph is higher than or equal to the number of processing elements; determining a topology for placing and connecting the processing elements in accordance with the structure of nodes of a resulting graph, the resulting graph being the complete graph or the combined graph.

According to one embodiment, the methodology comprises: mapping each of the processing elements to the corresponding node of the resulting graph based on the number of connections of the processing element and the type of connections, wherein the type of a connection is an input or output connection. The input connection of a processing element enables the processing element to receive data from another processing element. The output connection of a processing element enables the processing element to output data to another processing element.

In one example, the present method may provide a user the resulting graph and prompt the user to provide a placement and connections of the processing elements based on the resulting graph. For example, a user interface may be used to display the processing elements and their connections and the resulting graph so that the user can select (e.g. by a drag and drop) the processing elements to corresponding nodes of the graph. This may result in the topology that can be used for placing and connecting the processing elements in a chip card. In another example, a user graph such as the user graphs of FIGS. 5A-E descriptive of the processing elements and their connections may be provided. The placement and connections of the processing elements may be provided between vertices of the user graph and the resulting graph.

According to one embodiment, the mapping is performed such that the surface occupied by the processing elements is minimized or such that the physical length of the interconnection channels is minimized. The present subject matter may enable compact designs e.g. for hardware accelerators. For example, due to the non negligible physical size of PCM arrays, the present subject matter may be advantageous for such arrays because the communication infrastructure may exploit efficiently the proximity in space of the processing elements in order to meet the latency requirements. The present subject may allow easier design of the on chip I/O links by preferring connections to the closest neighbors. The present subject matter may enable feasible designs that can map easily on a 2D array of in-memory computational units, using for example interconnections at most within a 2×3 neighborhood.

According to one embodiment, the method further comprises: providing a user graph descriptive of the processing elements and their connections; generating a graph homomorphism between the user graph and the resulting graph such that a minimum number of connections needs to be active during execution of the computation task, wherein the mapping is performed in accordance with the graph homomorphism. The user graph may be a computational graph. The user graph may for example be a directed graph. Each node of the graph may correspond to an operation or variable; that is the node represents a processing element that performs the operation or stores the variable. Variables can feed their value into operations, and operations can feed their output into other operations.

This embodiment may enable to find the homomorphism that maps processing elements used for neural networks on the resulting graph. For example, for each set of processing elements that are aimed to perform a given computation task, if the condition of having the highest number of connections per processing element is smaller than or equal to (<=) Nmax is satisfied, at least one homomorphism may exist. The homomorphism may enable that a minimum number of connections needs to be active during a pipelined execution of the computation task. For example, the homomorphism may be injective. In this case, not all connections of the resulting graph may be used. In some cases, some connections may be omitted with regularity throughout the entire array (e.g. for architectures with at most 2 parallel connections, all diagonal connections in the complete graph are unused). This may for example enable to decide how many connections to implement for the processing elements e.g. on an ASIC.

For example, assuming a 2D array of N processing elements designed for the implementation of training of one specific network with less than 5 connections in parallel per layer, the network may be mapped, using a homomorphism, to a 5-Parallel Prism topology. The 5-Parallel Prism topology may be provided by the resulting graph e.g. resulting from a combination of multiple K6 graphs. Thus, given a user graph representation of an N-layer CNN with up to 5 parallel connections, representing convolutional layers with vertices and feature maps with edges, 3 an injective homomorphism that maps the layers of the CNN onto the vertices of an N-vertices 5-Parallel Prism such that it allows pipelined execution of the CNN and implements it with the minimum number of interconnections possible. The vertices of a 5-parallel prism represent processing units (e.g. crossbar arrays) that can implement the operations required by one layer of a CNN. And the edges may be bi-directional communication channels between these processing elements, communicating to both input and output memory of the processing elements. The N-vertices 5-Parallel Prism refers to the combined graph obtained by the combination of K6 graphs and having N vertices.

According to one embodiment, the computation task is a sequence of operations that is to be performed by respective processing elements, wherein the mapping is performed from the left to the right of the resulting graph in accordance with the sequence. In one example, a mapping path traversing all nodes of the resulting graph may be defined. The mapping path indicates the order in which the nodes of the resulting graph can be processed in order to map them to the corresponding processing elements. For each given processing element, the nodes may be processed along the path one by one starting from the first node of the path and each current node is checked if it has a number of connections that is equal or higher than the number of connections of the given processing element and if that node is not yet assigned to a processing element. If both conditions are fulfilled that node may be assigned to the given processing element, otherwise the next node may be processed and so on until assigning all processing elements to the corresponding nodes of the resulting graph. This may enable a systematic and automatic mapping of the processing elements.

According to one embodiment, the computation task is a training of a deep neural network (DNN) or inference of a trained DNN, wherein the processing elements are memristor crossbar arrays. The DNN may for example be a CNN such as AlexNet, ResNet, GoogLeNet, NIN, Inception v3, Inception v4, Squeezenet and VGG. This embodiment may enable a pipelined implementation of a neural network with up to Nmax parallel connections per layer.

According to one embodiment, each layer of the DNN has at most 5 parallel connections max=5), wherein the complete graph is a K6 graph.

According to one embodiment, the method further comprises processing the user graph in accordance with a physical implementation rule, the physical implementation rule requiring that: each processing element has a unified memory interface that represents both input and output memories of the processing element; concatenated nodes of the user graph preceding a given node can reach the given node by hopping to a temporally subsequent node of the user graph. Before performing the mapping between the user graph and the resulting graph, the user graph may be processed as described with this embodiment. This may enable a consistent and coherent mapping for different sets of processing elements.

According to one embodiment, the maximum number of connections of the user graph is 5, 11 or 15. The interconnection architecture describes a synchronous system enabling the physical implementation of the infrastructure with in-memory computational cores can scale without stalling or breaking the pipeline used for executing the computation task.

According to one embodiment, the complete graph is provided or generated with an even number of nodes that is higher than the maximum of the numbers of connections by one or two. This may enable a better, e.g. compact, placement and connections of the processing elements compared to the case where the complete graph is much higher than the maximum of the numbers of connections.

FIG. 1 is a flowchart of a method for enabling implementation of processing elements in an integrated circuit such as a chip or card. The integrated circuit may for example be used for a hardware accelerator. Hardware acceleration enables the use of computer hardware specially made to perform some functions more efficiently than is possible in software running on a general-purpose CPU. For example, an operation can be computed in application-specific hardware designed to compute the operation faster than on a general-purpose computer processor.

The integrated circuit may, for example, be configured so as to perform operations on analog and/or digital signals. The processing elements may for example be physically implemented functional units. The processing elements are provided such that the conventional instruction fetch and decode steps of an instruction cycle are not needed for performing a computation task. The computation task and the way data is communicated between the processing elements for performing the task may be defined or described by a user graph or computational graph. The implementation of the processing elements in the chip card may be performed such that the processing elements can interoperate to perform a computation task. The computation task may be break down into multiple operations. For example, in case of summing numbers, the task may be break down into prefix sum operations that enable to obtain the sum of the integers in an optimal way. In case of machine learning most of the computation tasks are a combination of one or more vector-matrix-multiplications and activation functions. For example, deep neural networks involve a vector-matrix-multiplication, in which a vector of neuron excitations, xi, is to be multiplied by a matrix of weights, wij, generating a new vector of neuron excitations for the next layer, yj. This breaks down the computation task into operations comprising multiply-accumulate operations (Σwij xi). Thus, depending on the computation task, the integrated circuit may need a predefined number of processing elements to perform the operations and to communicate data between each other to enable the computation task, wherein the data communication may require that each processing element has a respective number of connections to other processing elements e.g. each processing element has a number of parallel connections comprising the ingoing and outgoing connections to the processing element. The connection may refer to an edge connecting two vertices in a graph representation of the processing elements. That is, if two processing elements are connected, regardless of how they are connected or how many links are between them, the two processing elements are said to have a single connection between them e.g. for one processing element that connection would be an output/outgoing connection and for the other processing element that connection would be an input/ingoing connection. In other terms, the connection is defined regardless of the way the physical implementation of the links between e.g. crossbars is performed. This may particularly be advantageous, because in the physical implementation of the links, what matters is the distance between the two crossbars (e.g. the length of the link), which may uniquely be defined by the definition of the connection. For performing the same computation task using the same processing elements, different algorithms may be used such as a sequential execution algorithm or a pipelining execution algorithm. The algorithm may for example define the time at which one or more processing elements need to perform respective operations. Also, different placements of the processing elements may be used to perform the same computation task. However, some placements may be less performant than the others. The method of FIG. 1 may enable to find an optimal placement of the processing elements in the integrated circuit for improving the computation performances.

Figure 2A:
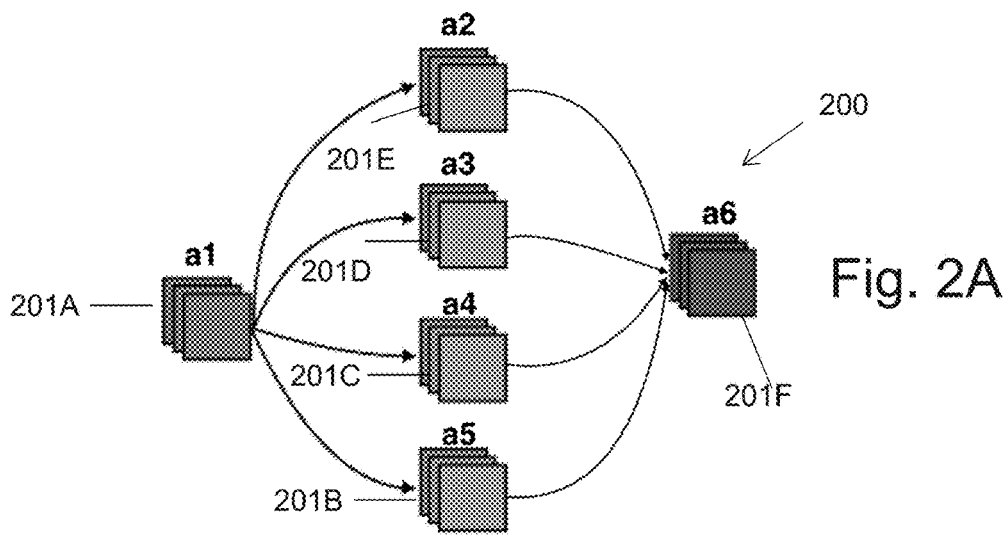
FIG. 2A illustrates a CNN with 6 layers and four parallel connections.

For simplification purpose, FIG. 1 is described with reference to the example of FIGS. 2A-2C but it is not limited to that example. FIG. 2A illustrates a CNN 200 comprising 6 layers 201A-F. For performing a computation task such as the training of the CNN 200 or the use of the trained CNN 200 for inference, data may need to be communicated between the layers of the of the CNN 200 as follows. The first layer 201A needs to communicate data with the following layers 201B-E and thus has four connections. Each of the layers 201B-E needs to communicate data with the following layer 201F and with the first layer 201A. Thus, each of the layers 201B-E has two connections. The last layer 201F needs to receive data from each of the layers 201B-E. Thus, the last layer 201E has four connections. The computation task involves as described above matrix vector multiplications. For that, six crossbar arrays may be associated with respective layers 201A-F. In another example, a layer may be associated with more than one crossbar array. This may particularly be advantageous in case the matrix vector multiplication is decomposed into multiple multiplications that can be performed by the more than one crossbar array. The crossbar arrays may be used for implementing the multiplications. Each of the crossbar arrays may compute the multiplication of weight elements $W_{ij}$ with an activation vector x. For example, the matrix-vector multiplication of a matrix W having elements Wij with activation vector x of the input layer may be realized through a first memristive crossbar array by representing each matrix element with the conductance of the corresponding memristor element of the first memristive crossbar array, wherein the multiplication of the matrix W and vector x may be performed by inputting voltages representing the vector values x to the first memristive crossbar array and the resulting currents are indicative of the product of W and x. A resistive memory element (or device) of the crossbar array may for example be one of a phase change memory (PCM), metal-oxide resistive RAM, conductive bridge RAM and magnetic RAM.

Figure 2B:
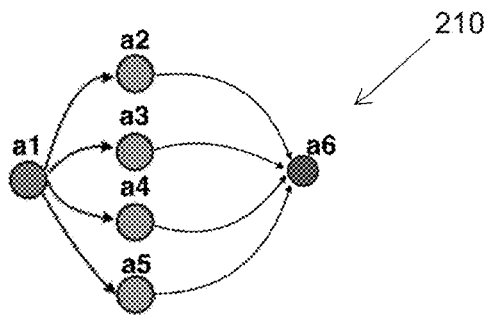
FIG. 2B depicts a user graph representing the CNN of FIG. 2A.

Thus, having processing elements which are six crossbar arrays and a computation task e.g. training of the CNN 200, a user graph may be defined as shown in FIG. 2B. The user graph 210 represents the crossbar arrays with respective vertices a1 to a6. The user graph 210 also shows the connections between the vertices a1 to a6 as being the connections required for data communication as described above. As shown in FIG. 2B, the maximum number (Nmax) of parallel connections that is associated with a given vertex of the user graph 210 is four, which is the number of connections associated with the first and last layers 201A and 201F.

Referring back to FIG. 1, in step 101, a complete graph may be generated. The complete graph may comprise a number of nodes. The number of nodes may be determined based on the maximum number of parallel connections Nmax. The number of nodes may be an even number. This may enable a systematic method that can scale with the number of connections. The number of nodes of the complete graph may be higher than the maximum number Nmax of connections that can connect a processing element of the processing elements. For example, the number of nodes of the complete graph may be equal to Nmax+1 or Nmax+2 depending on whether Nmax is an odd or even number. In another example, the number of nodes of the complete graph may be equal to Nmax+3 or Nmax+4 depending on whether Nmax is an odd or even number. If Nmax is an odd number, the number of nodes of the complete graph is Nmax+1 (Nmax+3). If Nmax is an even number, the number of nodes of the complete graph is Nmax+2 (Nmax+4). Following the example of FIG. 2A, the complete graph may be a K6 graph, as shown in FIG. 2C, because Nmax=4 as described above. The K6 graph may be referred as a unit cell which may be a triangular-prism-shaped graph formed by 6 vertices and 15 edges in which every vertex has an edge connected to any other vertex. The graph edges are the prism edges and diagonals. The vertices are represented as circles.

It may be determined in inquiry step 103 if the number of processing elements required to perform the computation task is higher that the number of nodes of the generated complete graph. This may be needed as the processing elements need to all be mapped to respective nodes of the generated graph. Following the example of FIGS. 2A and 2B, the K6 graph has 6 nodes which is higher than the number five of crossbar arrays.

In case the number of processing elements required to perform the computation task is higher that the number of nodes of the generated complete graph, the generated complete graph may be duplicated or reproduced a number of times such that when combining in step 105 the duplicated graphs into a combined graph the number of nodes in the combined graph is higher than or equal to the number of processing elements. For example, the complete graph may be a $K_M$ graph where M is an even number and the number of processing elements is higher than M. In this case, the combination of complete graphs $K_M$ may be performed so as to obtain a combined graph having N vertices, where N may for example be the smallest number that is higher than or equal to the number of processing elements and that can be obtained by combinations of the graphs $K_M$. For example, the following first algorithm may be used for performing the combination.

% Let there be a set of disjoint set of N vertices $\{a_0, \ldots, a_{N-1}\}$
% This code creates an N vertices M Parallel Prism built on complete graphs $K_M$
% With M an even number
for i=0:ceil((N−M)/2):
    add edges such that $\{a_{2 \cdot i}, \ldots, a_{M+2 \cdot i}\}$ is a complete graph $K_M$ In another example, e.g. for M=6, the combined graph that results from combination of K6 graphs may be referred to as 5-parallel prism which may be obtained by merging alternatively a unit cell and a unit cell rotated by 180 degrees around its vertical axis. For example, an N vertices 5-Parallel Prism may be obtained by merging ((N−6)/2+1) unit cells.

A topology or methodology for placing and connecting the processing elements in the chip or the card may be determined in step 107 in accordance with the structure of nodes of the complete graph or the combined graph. Following the example of K6 graph, the five processing elements need to be mapped to corresponding nodes of the K6 graph using the number of connections associated with each processing element and the type of connections e.g. outgoing or ingoing connections. This mapping may for example be performed using user inputs e.g. a user may be provided with the K6 graph and the computation graph 210 and prompted for providing the mapping. In another example, the mapping may automatically be performed as described herein. This may for example be performed using a homomorphism algorithm as described herein.

Figure 2C:
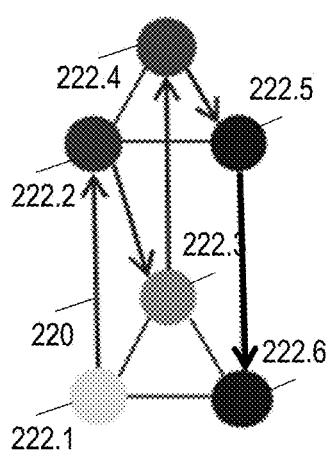
FIG. 2C depicts a complete graph in accordance with an example of the present subject matter.
Figure 2D:
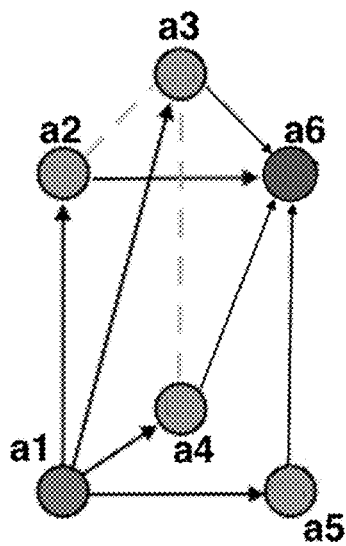
FIG. 2D illustrates the resulting topology of the processing elements.

In another example, the mapping may be performed following a mapping direction 220 as shown on K6 graph of FIG. 2C. The mapping direction or path is defined by the following order of nodes of the K6 graph: 222.1→222.2→222.3→222.4→222.5→222.6. The processing elements may be ordered depending on the steps they perform. For example, if the computation task comprises a succession of steps, the processing element performing the first step may first be ordered followed by the processing element that performs the second step and so on. In the example of FIGS. 2A and 2B, the processing elements as indicated by arrows directions in FIG. 2B, are ordered as a1, followed by four vertices a2, a3, a4 and a5, and the four vertices are followed by a6. A pipelining and parallel executions may be performed using the processing elements of a1-a6 because the computation task may comprise the repetition or iteration of the matrix-vector multiplications e.g. for different activations of the same input image or for different input images. The mapping may then be performed starting with element a1 and following the mapping direction 220. That is, it may be determined if node 222.1 has a number of connections that corresponds to the connections of a1, and if so a1 may be mapped to the node 222.1, otherwise, the next node 222.2 may be checked and so on. After mapping a1 to node 222.1, the next processing element may be mapped by choosing one of the remaining nodes 222.2-6 following the mapping direction as described with a1. The constraint used to generate the complete graph in step 101 may enable to always find a mapping between nodes of a K6 graph and processing elements (e.g. in the number smaller than or equal to 6 (<=6)) and that have a maximum number of parallel connections of 4 or 5 per processing element. The resulting topology of the processing elements a1 to a6 is shown in FIG. 2D. The topology provides and optimal placement of the processing elements of the DNN 200 that enables performing for example pipelining execution and also a compact implementation. Once the mapping is performed, the topology of FIG. 2D may for example be used to manufacture a chip or card having the processing elements and the processing elements may be interconnected accordingly. The interconnection may for example be performed in two ways. In one example, the resulting graph of FIG. 2D provides a method for interconnecting processing elements, so that the connectivity in the chip, e.g. of an ASIC, mirrors exactly the resulting graph of FIG. 2D. This provides a flexible ASIC onto which anything can be mapped that can be executed on the resulting graph of FIG. 2D. In another example, some connections of the resulting graph of FIG. 2D may be omitted with regularity throughout the entire array of the processing elements on the chip. This may for example enable to decide how many connections to implement for the processing elements. In other terms, the user graph of FIG. 2B is first mapped on the resulting graph of FIG. 2C, then the ASIC may be built based on the connections that are active in the mapping indicated by the graph of FIG. 2D.

Figure 3A:
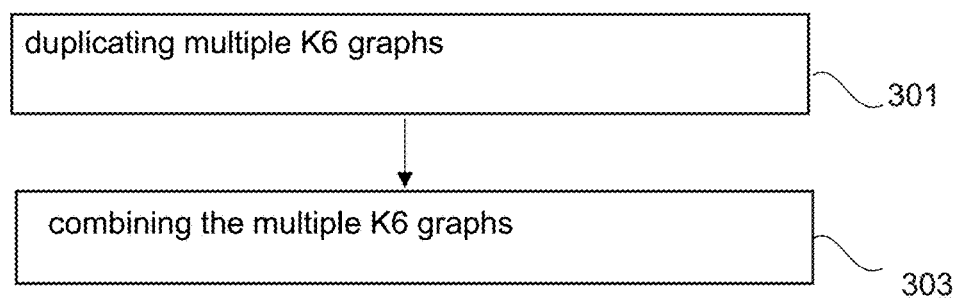
FIG. 3A is a flowchart of a method for generating a graph in accordance with an example of the present subject matter.

FIG. 3A is a flowchart of a method for generating a graph in accordance with an example of the present subject matter. The method of FIG. 3A may provide further details of step 105. For simplification of the description, FIG. 3A is described with the example of FIGS. 3C-E that represents the number of processing elements that is higher than six. In this example, Nmax may be equal to 5.

Figure 3B:
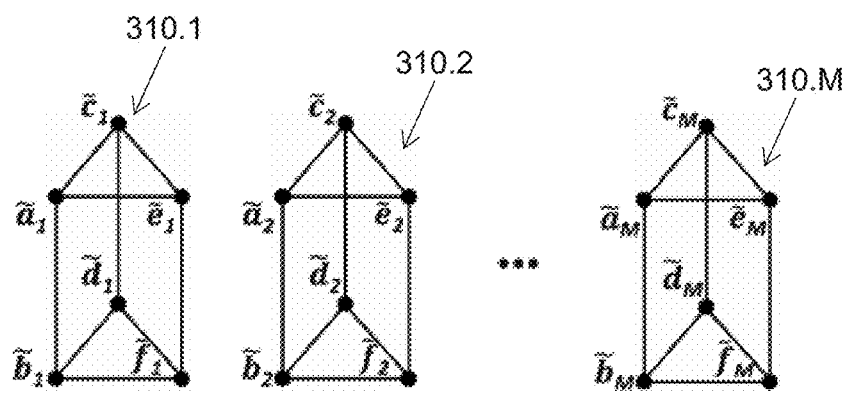
FIG. 3B shows multiple duplicated K6 graphs.
Figure 3C:
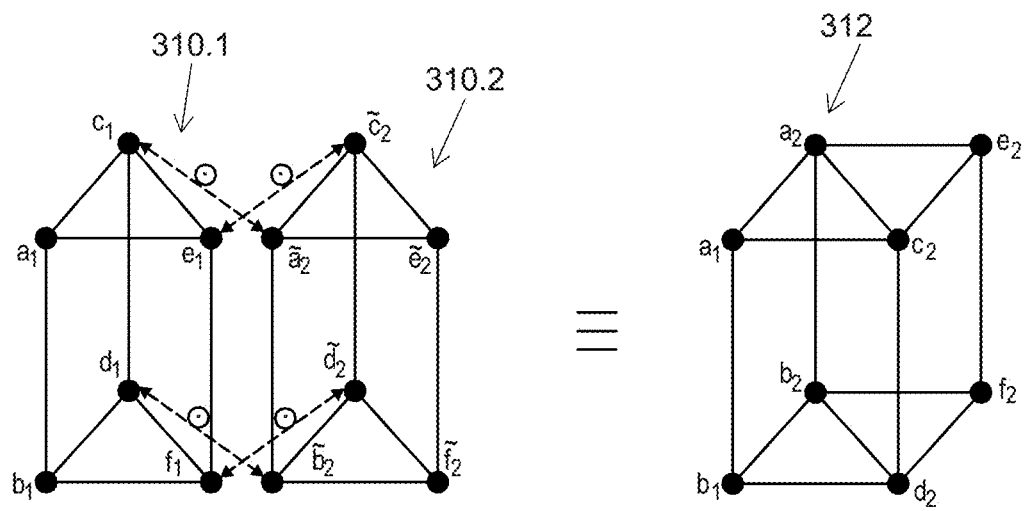
FIG. 3C illustrates the combination of two K6 graphs.
Figure 3D:
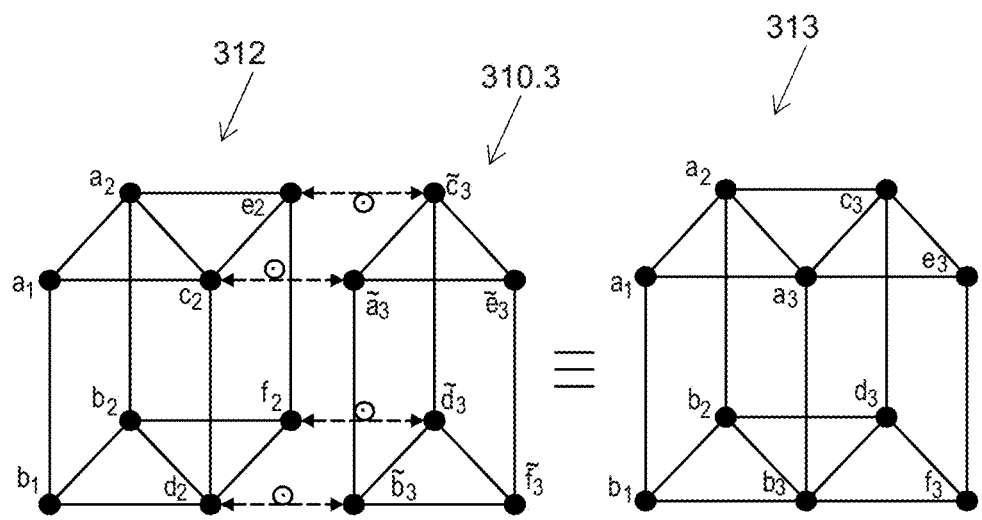
FIG. 3D illustrates the combination of three K6 graphs.

In step 301, multiple (M) complete K6 graphs 310.1 to 310.M may be provided or generated as shown in FIG. 3B. The K6 graphs 310.1 to 310.M may be referred to as duplicated graphs. In step 303, at least part of the K6 graphs 310.1-M may be combined. For example, if the number of processing elements is 7 or 8, two K6 graphs may be combined as shown in FIG. 3C. The resulting combined graph 312 may for example be used for implementing a number of processing elements smaller than or equal to 8 as described with reference to FIG. 1. If in another example, the number of processing elements is 9 or 10, three K6 graphs may be combined as shown in FIG. 3D. For that, first two K6 graphs 310.1 and 310.2 may be combined to obtain the combined graph 312. The combined graph 312 may then be combined with the third K6 graph 310.3. This may result in combined graph 313. The combined graph 313 may for example be used for implementing a number of processing elements smaller than or equal to 10 as described with reference to FIG. 1.

The combination of the graphs in step 303 may be performed using the algorithm 320 of FIG. 3E. The dashed lines in FIGS. 3C and 3D illustrate the combination as performed using the algorithm 320 in order to perform vertex identification of the combined graph. The algorithm 320 is equivalent to (or may be obtained from) the first algorithm described above, with M=6. FIGS. 3B-D show only part of the connections per vertex, for clarity purpose, but they have more connections per vertex.

Figure 4A:
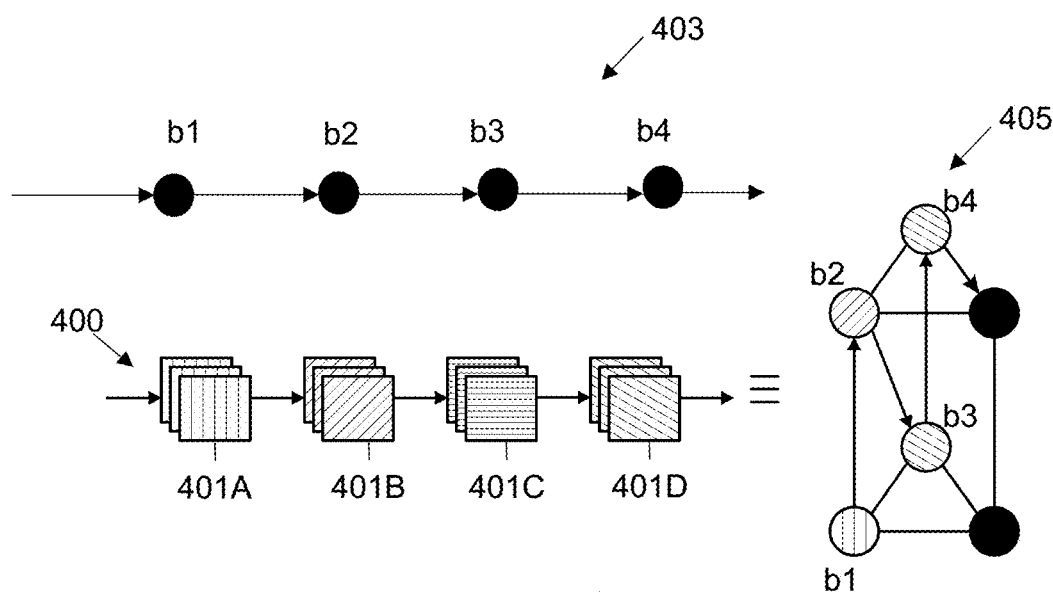
FIG. 4A illustrates an example topology of processing elements of an example deep neural network (DNN).
Figure 4B:
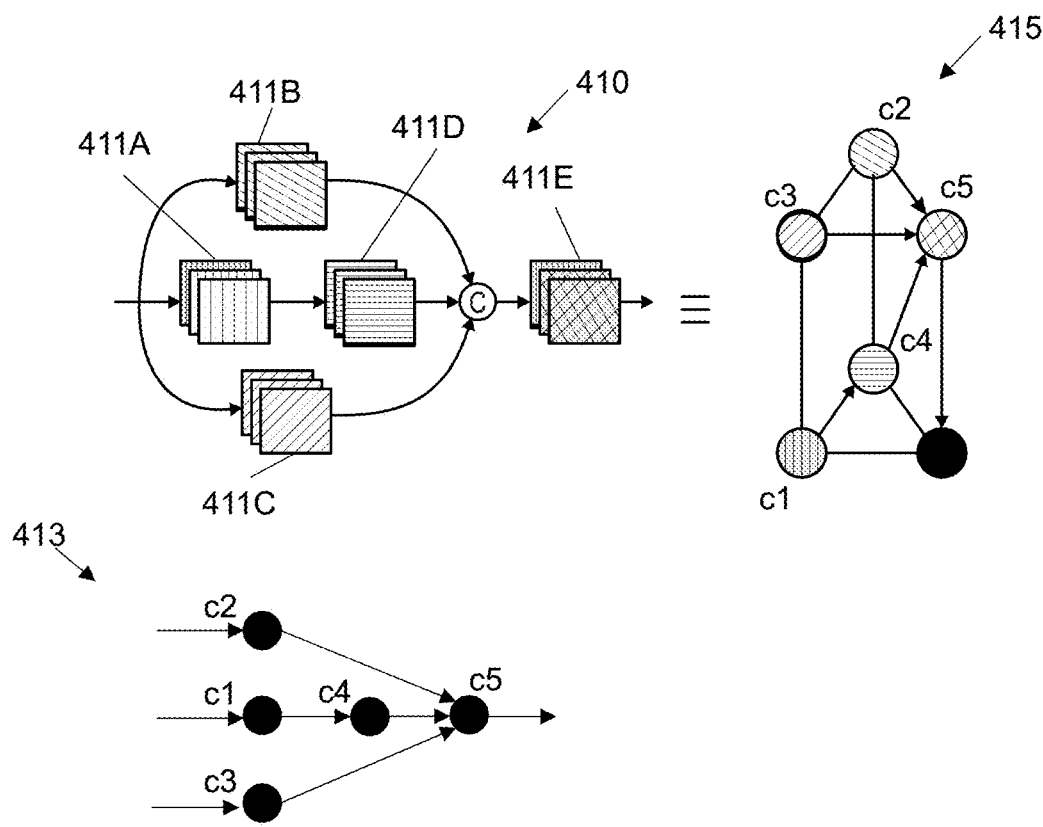
FIG. 4B illustrates an example topology of processing elements of an example DNN.
Figure 4C:
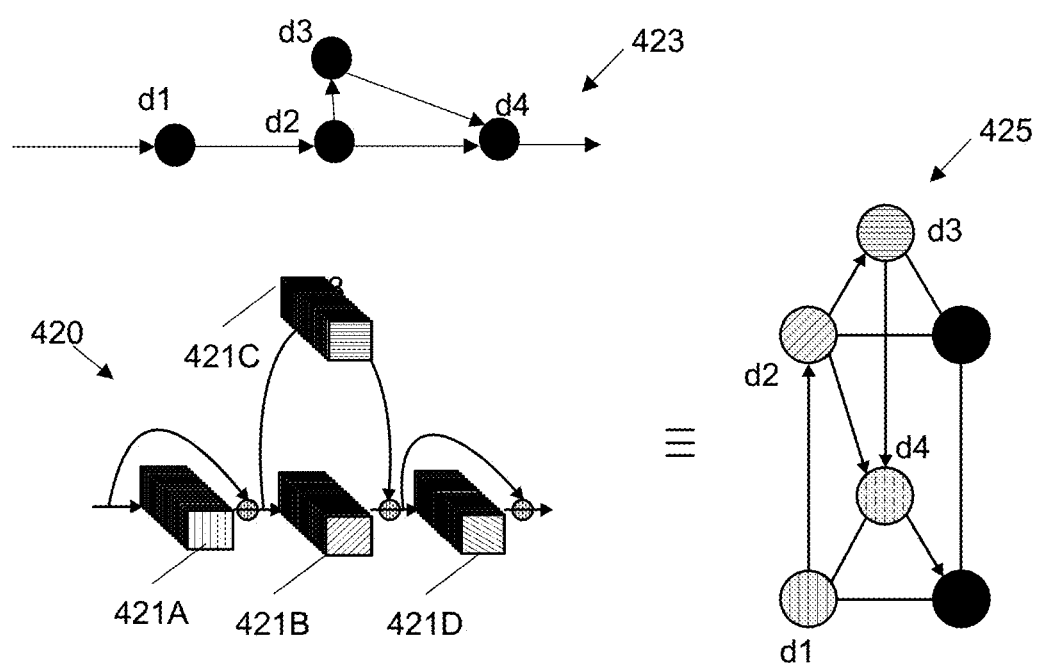
FIG. 4C illustrates an example topology of processing elements of an example DNN.

FIGS. 4A-C show the mapping results for different DNN architectures.

In FIG. 4A, a DNN 400 having four layers 401A-D which may be trained using a hardware accelerator that implements four crossbar arrays to perform the matrix-vector multiplications as described above. For performing a computation task such as the training of the DNN 400 or the use of the trained DNN 400 for inference, data may need to be communicated between the layers of the of the DNN 400 as follows. The first layer 401A needs to communicate data with each the following layer 401B and thus has one connection. The second layer 401B needs to communicate data with the following layer 401C and with the first layer 401A. Thus, the second layer 401B has two connections. The third layer 401C needs to communicate data with the following layer 401D and with the third layer 401C. Thus, the third layer 401C has two connections. The fourth layer 401D needs to communicate data with the third layer 401C. Thus, the fourth layer 401D has one connection. A user graph 403 may be defined as shown in FIG. 4A. The user graph 403 represents the crossbar arrays with respective vertices b1 to b4 (which also represent the layers 401A-D receptively). The user graph 403 also shows the connections between the vertices b1 to b4 as being the connections required for data communication as described above. As shown in FIG. 4A, the maximum number (Nmax) of parallel connections that is associated with a given vertex of the user graph 403 is two, which is the number of connections associated with second and third layers 401B-C. Since the maximum number of connections is 2, the number of nodes in the complete graph may be 4+2=6 as described with step 101, which is a K6 graph. Since the number of vertices (b1-b4) in the user graph 403 is four there may be no need to combine K6 graphs as they have 6 nodes. As described with reference to FIG. 1, the mapping may be performed following the mapping direction 220 as shown in FIG. 2C. The resulting mapping between the processing elements b1 to b4 of the user graph 403 and the nodes of K6 graph results in the topology 405 of the processing elements b1-b4.

In FIG. 4B, a DNN 410 having five layers 411A-D may be trained using a hardware accelerator that implements five crossbar arrays, or any processing unit that can perform matrix-vector multiplication, to perform the matrix-vector multiplications as described above. For performing a computation task such as the training of the DNN 410 or the use of the trained DNN 410 for inference, data may need to be communicated between the layers of the of the DNN 410 as follows. The first layer 411A needs to communicate data with the following layer 401D and thus has one connection. The second layer 411B needs to communicate data with the following layer 411E. Thus, the second layer 411B has one connection. The third layer 411C needs to communicate data with the following layer 411E. Thus, the third layer 411C has one connection. The fourth layer 411D needs to communicate data with the following layer 411E and with first layer 411A. Thus, the fourth layer 411D has two connections. The fifth layer 411E needs to communicate data with the three layers 411B-D. Thus, the fifth layer 411E has three connections. Each of the layers 411B-D may communicate data with the layer 411E by hopping to an intermediate temporarily node 412. A user graph 413 may be defined as shown in FIG. 4B. The user graph 413 represents the crossbar arrays with respective vertices c1 to c5 (which also represent the layers 411A-E receptively). The user graph 413 also shows the connections between the vertices c1 to c5 as being the connections required for data communication as described above. As shown in FIG. 4B, the maximum number (Nmax) of parallel connections that is associated with a given vertex of the user graph 403 is three, which is the number of connections associated with the last layer 411E. Since the maximum number of connections Nmax=3, the number of nodes in the complete graph may be 3+3=6 as described with step 101, which is a K6 graph. Since the number of vertices (c1-c5) in the user graph 413 is five there may be no need to combine K6 graphs as they have 6 nodes. As described with reference to FIG. 1, the mapping may be performed following the mapping direction 220 as shown in FIG. 2C. The resulting mapping between the processing elements c1 to c5 of the user graph 413 and the nodes of K6 graph results in the topology 415 of the processing elements c1-c5.

In FIG. 4C, a DNN 420 having four layers 421A-D may be trained using a hardware accelerator that implements four crossbar arrays to perform the matrix-vector multiplications as described above. For performing a computation task such as the training of the DNN 420 or the use of the trained DNN 420 for inference, data may need to be communicated between the layers of the of the DNN 420 as follows. The first layer 421A needs to communicate data with the following layer 421B and thus has one connection. The second layer 421B needs to communicate data with the following layer 401C and 421D and with the first layer 421A. Thus, the second layer 401B has three connections. The third layer 421C needs to communicate data with the following layer 421D and with the second layer 421B. Thus, the third layer 421C has two connections. The fourth layer 421D needs to communicate data with the second and third layers 421B-C. Thus, the fourth layer 421D has two connection. A user graph 423 may be defined as shown in FIG. 4C. The user graph 423 represents the crossbar arrays with respective vertices d1 to d4 which represent the layers 421A-D receptively. The user graph 423 also shows the connections between the vertices d1 to d4 as being the connections required for data communication as described above. As shown in FIG. 4C, the maximum number (Nmax) of parallel connections that is associated with a given vertex of the user graph 423 is three, which is the number of connections associated with second layer 421B. Since the maximum number of connections in the user graph 423 is three, the number of nodes in the complete graph may be 3+3=6 as described with step 101, which is a K6 graph. Since the number of vertices (d1-d4) in the user graph 423 is four there may be no need to combine K6 graphs as they have 6 nodes. As described with reference to FIG. 1, the mapping may for example be performed following the mapping direction 220 as shown in FIG. 2C. The resulting mapping between the processing elements d1 to d4 of the user graph 403 and the nodes of K6 graph results in the topology 425 of the processing elements d1-d4.

FIGS. 5A-D illustrate graph representation rules for providing user graphs for DNNs in accordance with an example of the present subject matter. For example, for CNNs, vertices may be identified only with convolutional layers, and not pooling operations. For example, given processing elements that perform one operation, the user graph may feature vertices that represent one instance of that operation. As the multiply-and-accumulate operation of the convolutional layers is the most computationally intensive, this may also be advantageous for any digital pipeline implementation.

Figure 5A:
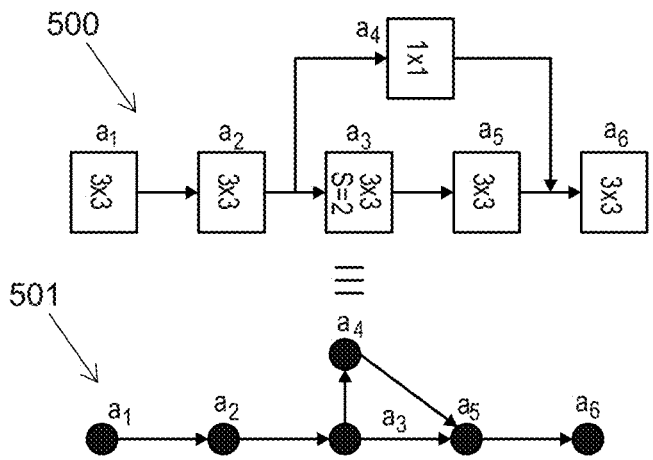
FIG. 5A illustrates a user graph representation rule for generating user graphs in accordance with an example of the present subject matter.

As shown in FIG. 5A, in a classic representation 500 of a CNN, the left side of the boxes may stand for the input of the layers and the right side its output. Physically, the distinction between the input and output of the layer translates to the distinction between the input memory (the operands) and output memory (the result) in the processing element. According to a first graph representation rule, the concept of input and output memory may be abstracted, meaning the communication links between computational units see a unified memory interface. The resulting user graph 501 is shown in FIG. 5A.

Figure 5B:
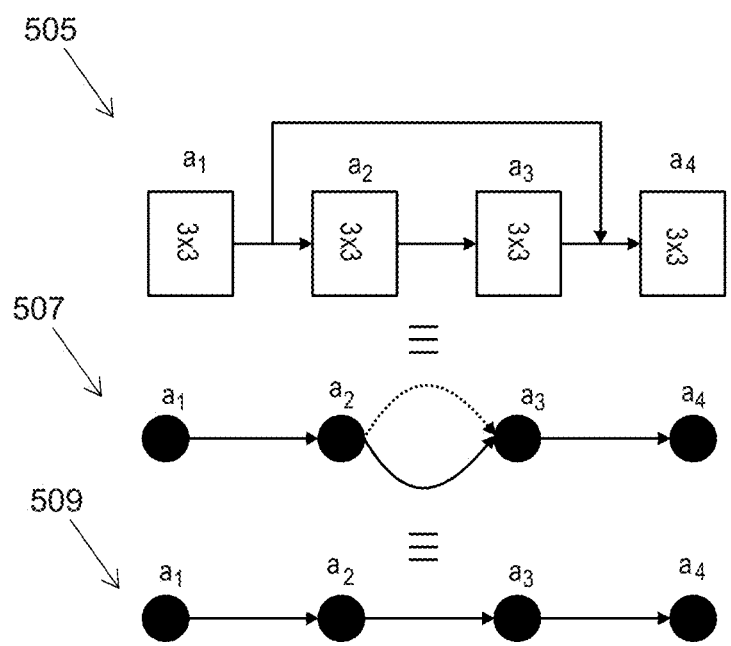
FIG. 5B illustrates a user graph representation rule for generating user graphs in accordance with an example of the present subject matter.

FIG. 5B illustrates a second representation rule according to which parallel edges of an initial graph 507 are removed resulting in user graph 509. The initial graph 507 may be a user graph that is obtained from a classic representation 505 using the first representation rule. This may enable to simplify the user graphs in particular after applying the first rule, because once removed the concept of input and output memory, the graph 507 may become non simple. Since a non-simple graph can have an ambiguous physical meaning, all the graphs are simplified (graph 509).

Figure 5C:
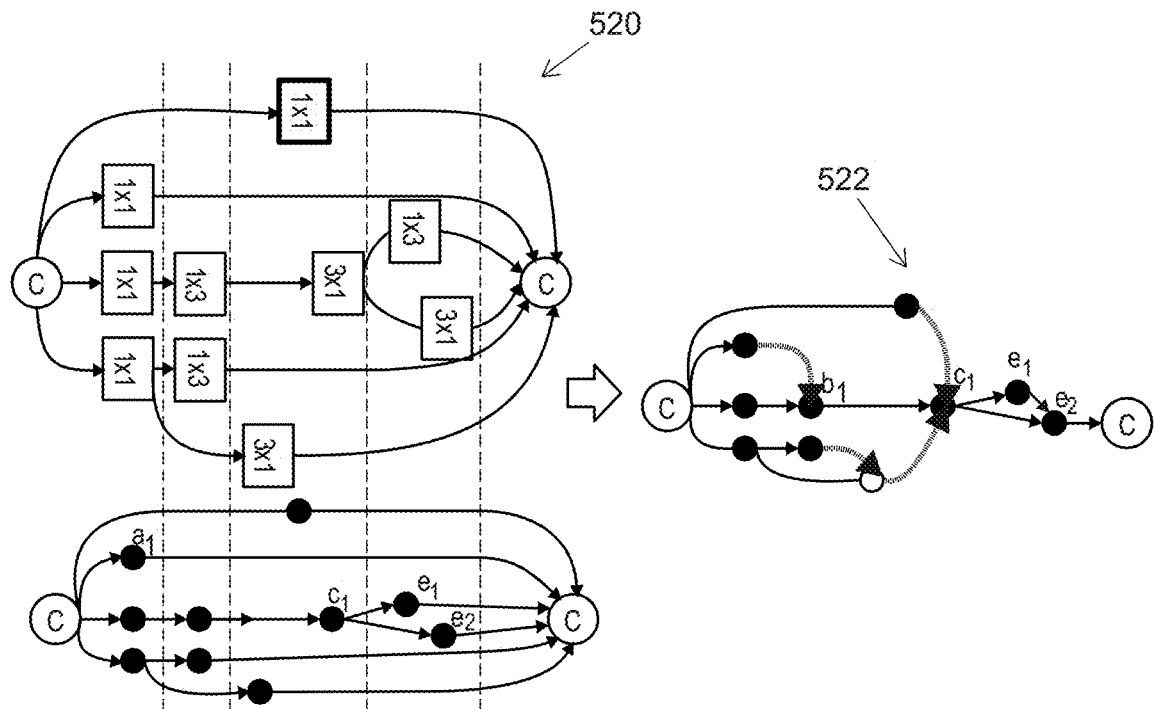
FIG. 5C illustrates a user graph representation rule for generating user graphs in accordance with an example of the present subject matter.

FIG. 5C shows an s-p graph 520 which is a common representation in the inception architectures, where the sink and the source are two concatenation nodes. Parallel branches are organized based on their latency. On the time axis in the figure it is reported the latency before the output of the first pixel of a given layer. According to a third representation rule, concatenated nodes temporally preceding the last longest latency path node can reach the concatenation node by hopping to any temporally subsequent node. The resulting graph 522 is shown in FIG. 5C.

Figure 5D:
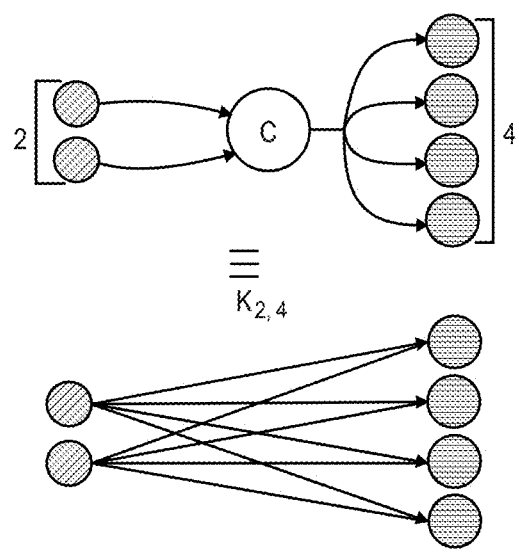
FIG. 5D illustrates a user graph representation rule for generating user graphs in accordance with an example of the present subject matter.

FIG. 5D illustrates a fifth representation rule based on the assumption that a concatenation does not imply any operation on the data, and thus it cannot be represented as a vertex in the graph. Given this assumption, the concatenation of m vertices being fed to n others is equivalent to a complete bipartite graph $k_{m,n}$ as illustrated in FIG. 5D with an example of m=2 and n=4.

Figure 6:
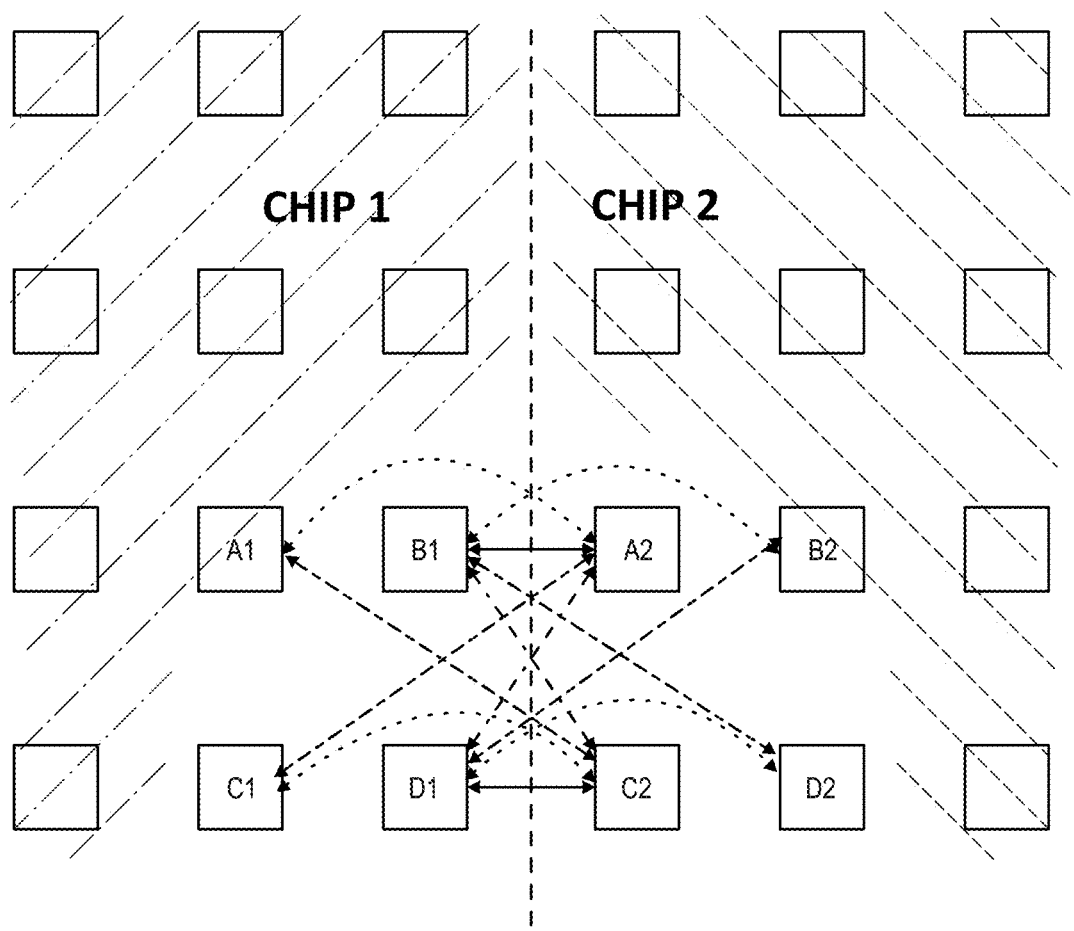
FIG. 6 depicts a diagram of chip cards that can be used to implement the processing elements in accordance with an example of the present disclosure.

FIG. 6 depicts a diagram of chip cards that can be used to implement the processing elements in accordance with an example of the present disclosure. This may enable the physical implementation of the processing elements on different chips. FIG. 6 shows the placement of 8 processing elements in two chips. For the data flow to continue, communication between two 3-by-2 neighborhoods must be ensured. This means 6 off-chip connections for computational unit B1 and 6 for computational unit D1. This may particularly be advantageous as a CNN pipeline implemented with a 5-Parallel Prism infrastructure is a sequential flow that may encompass an arbitrarily long sequence of two rows of processing elements.

Figure 7:
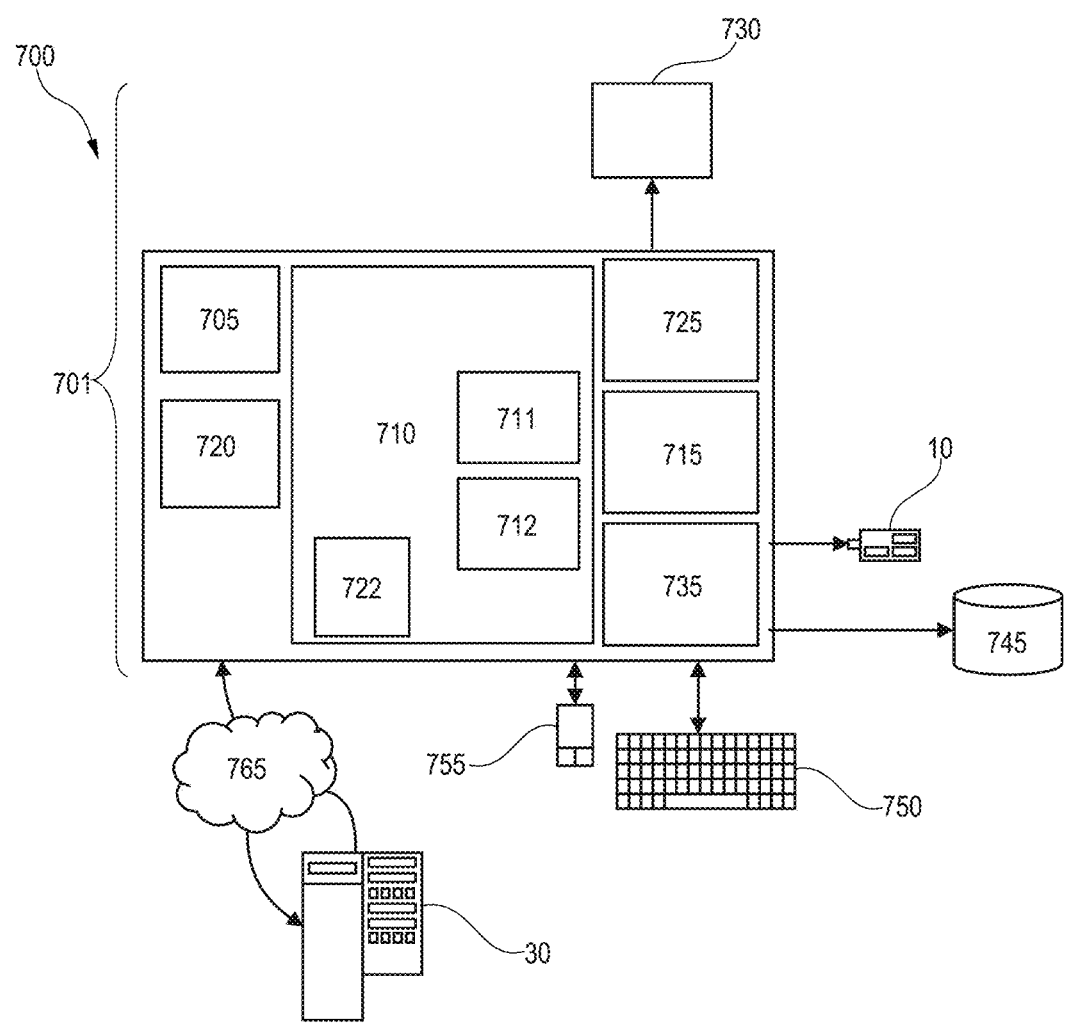
FIG. 7 represents a computerized system, suited for implementing one or more method steps as involved in the present disclosure.

FIG. 7 represents a general computerized system 700 for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 712, 722 (including firmware 722), hardware (processor) 705, or a combination thereof. In exemplary embodiments, the methods described herein are implemented in software, as an executable program, and is executed by a special or general-purpose digital computer, such as a personal computer, workstation, minicomputer, or mainframe computer. The most general system 700 therefore includes a general-purpose computer 701.

In exemplary embodiments, in terms of hardware architecture, as shown in FIG. 7, the computer 701 includes a processor 705, memory (main memory) 710 coupled to a memory controller 715, and one or more input and/or output (I/O) devices (or peripherals) 10, 745 that are communicatively coupled via a local input/output controller 735. The input/output controller 735 can be, but is not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 745 may generally include any generalized cryptographic card or smart card known in the art.

The processor 705 is a hardware device for executing software, particularly that stored in memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing software instructions.

The memory 710 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 710 can have a distributed architecture, where various components are situated remote from one another, but can be accessed by the processor 705.

The software in memory 710 may include one or more separate programs, each of which comprises an ordered listing of executable instructions for implementing logical functions, notably functions involved in embodiments of this invention.

The software in memory 710 shall also typically include a suitable operating system (OS) 111. The OS 711 essentially controls the execution of other computer programs, such as possibly software 712 for implementing methods as described herein.

The methods described herein may be in the form of a source program 712, executable program 712 (object code), script, or any other entity comprising a set of instructions 712 to be performed. When a source program, then the program needs to be translated via a compiler, assembler, interpreter, or the like, which may or may not be included within the memory 710, so as to operate properly in connection with the OS 711. Furthermore, the methods can be written as an object oriented programming language, which has classes of data and methods, or a procedure programming language, which has routines, subroutines, and/or functions.

In exemplary embodiments, a conventional keyboard 750 and mouse 755 can be coupled to the input/output controller 735. Other output devices such as the I/O devices 745 may include input devices, for example but not limited to a printer, a scanner, microphone, and the like. Finally, the I/O devices 10, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 745 can be any generalized cryptographic card or smart card known in the art. The system 700 can further include a display controller 725 coupled to a display 730. In exemplary embodiments, the system 700 can further include a network interface for coupling to a network 765. The network 765 can be an IP-based network for communication between the computer 701 and any external server, client and the like via a broadband connection. The network 465 transmits and receives data between the computer 701 and external systems 30, which can be involved to perform part or all of the steps of the methods discussed herein. In exemplary embodiments, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the software in the memory 710 may further include a basic input output system (BIOS) 722. The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to execute software 712 stored within the memory 710, to communicate data to and from the memory 710, and to generally control operations of the computer 701 pursuant to the software. The methods described herein and the OS 711, in whole or in part, but typically the latter, are read by the processor 705, possibly buffered within the processor 705, and then executed.

When the systems and methods described herein are implemented in software 712, as is shown in FIG. 7, the methods can be stored on any computer readable medium, such as storage 720, for use by or in connection with any computer related system or method. The storage 720 may comprise a disk storage such as HDD storage.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for implementing processing elements in a chip or card such that the processing elements can communicate data between each other in order to perform a computation task, wherein the data communication requires each processing element to have a respective number of connections to other processing elements; the method comprising:
providing a complete graph with an even number of nodes that is higher than the maximum of the numbers of connections;
if the number of processing elements is higher that the number of nodes of the graph, duplicating the graph and combining the duplicated graphs into a combined graph such that the number of nodes in the combined graph is higher than or equal to the number of processing elements;
determining a methodology for placing and connecting the processing elements in accordance with the structure of nodes of a resulting graph, the resulting graph being the complete graph or the combined graph.

2. The method of claim 1, the methodology comprising: mapping each of the processing elements to the corresponding node of the resulting graph based on the number of connections of the processing element and the type of connections, wherein the type of a connection is an input or output connection.

3. The method of claim 2, wherein the mapping is performed such that the physical length of the interconnection channels is minimized.

4. The method of claim 2, further comprising: providing a user graph descriptive of the processing elements and their connections; generating a graph homomorphism between the user graph and the resulting graph such that a minimum number of connections needs to be active during execution of the computation task, wherein the mapping is performed in accordance with the graph homomorphism.

5. The method of claim 1, the computation task is a sequence of operations that is to be performed by respective processing elements, the method further comprising providing a mapping path on the resulting graph, wherein the mapping is performed following the mapping path of the resulting graph in accordance with the sequence.

6. The method of claim 1, the computation task being a training of a deep neural network (DNN) or inference of trained DNN, wherein the processing elements are memristor crossbar arrays.

7. The method of claim 6, wherein the DNN is a convolutional neural network.

8. The method of claim 1, the computation task being a training or inference of a deep neural network (DNN), wherein the processing elements are computational memory cores based on circuit elements such as complementary metal-oxide-semiconductor transistors, resistors and capacitors.

9. The method of claim 1, the computation task being a training or inference of a deep neural network (DNN), wherein the processing elements are central processing units and associated peripheral units such as memory and control units.

10. The method of claim 1, the computation task being a training of a deep neural network (DNN) or inference of trained DNN, wherein the processing elements are memristor crossbar arrays, and wherein each layer of the DNN has at most 5 parallel connections, wherein the complete graph is a K6 graph.

11. The method of claim 1, the methodology comprising: mapping each of the processing elements to the corresponding node of the resulting graph based on the number of connections of the processing element and the type of connections, wherein the type of a connection is an input or output connection;

further comprising: providing a user graph descriptive of the processing elements and their connections; generating a graph homomorphism between the user graph and the resulting graph such that a minimum number of connections needs to be active during execution of the computation task, wherein the mapping is performed in accordance with the graph homomorphism;

further comprising processing the user graph in accordance with a physical implementation rule, the physical implementation rule requiring that:

each processing element has a unified memory interface that represents both input and output memories of the processing element;

concatenated nodes of the user graph preceding a given node can reach the given node by hopping to a temporally subsequent node of the user graph.

12. The method of claim 1, wherein the complete graph has an even number of nodes that is higher than the maximum of the numbers of connections by one or two.

13. A computer system for enabling implementation of processing elements in a chip or card such that the processing elements can communicate data between each other in order to perform a computation task, wherein the data communication requires each processing element to have a respective number of connections to other processing elements, the computer system being configured for:

providing or generating a complete graph with an even number of nodes that is higher than the maximum of the numbers of connections;

if the number of processing elements is higher that the number of nodes of the graph, duplicating the graph and combining the duplicated graphs into a combined graph such that the number of nodes in the combined graph is higher than or equal to the number of processing elements;

determining a methodology for placing and connecting the processing elements in accordance with the structure of nodes of a resulting graph, the resulting graph being the complete graph or the combined graph.

14. A computer program product comprising a computer-readable storage medium having computer-readable program code embodied therewith, the computer-readable program code configured for enabling implementation of processing elements in a chip or card such that the processing elements can communicate data between each other in order to perform a computation task, wherein the data communication requires each processing element to have a respective number of connections to other processing elements; the computer-readable program code further configured for:

providing or generating a complete graph with an even number of nodes that is higher than the maximum of the numbers of connections;

if the number of processing elements is higher that the number of nodes of the graph, duplicating the graph and combining the duplicated graphs into a combined graph such that the number of nodes in the combined graph is higher than or equal to the number of processing elements;

determining a methodology for placing and connecting the processing elements in accordance with the structure of nodes of a resulting graph, the resulting graph being the complete graph or the combined graph.

* * * * *